United States Patent
Ashiya et al.

(10) Patent No.: US 10,097,541 B2
(45) Date of Patent: Oct. 9, 2018

(54) COMPUTER SECURITY BASED ON MOUSE DEVICE SPEED SETTING AUTHENTICATION

(71) Applicant: CA, Inc., New York, NY (US)

(72) Inventors: Himanshu Ashiya, Bangalore (IN); Atmaram Shetye, Mapusa (IN)

(73) Assignee: CA, Inc., New York, NY (US)

( * ) Notice: Subject to any disclaimer, the term of this patent is extended or adjusted under 35 U.S.C. 154(b) by 274 days.

(21) Appl. No.: 15/146,442

(22) Filed: May 4, 2016

(65) Prior Publication Data

US 2017/0324734 A1 Nov. 9, 2017

(51) Int. Cl.
*H04L 29/06* (2006.01)
*G06F 21/44* (2013.01)

(52) U.S. Cl.
CPC .......... *H04L 63/0853* (2013.01); *G06F 21/44* (2013.01); *H04L 63/0861* (2013.01); *H04L 63/0876* (2013.01)

(58) Field of Classification Search
CPC ................................................. H04L 63/0876
See application file for complete search history.

(56) References Cited

U.S. PATENT DOCUMENTS

| | | | | |
|---|---|---|---|---|
| 5,287,120 A * | 2/1994 | Okada | ..................... | G06F 3/038 345/157 |
| 5,599,231 A * | 2/1997 | Hibino | ..................... | A63F 13/10 463/29 |
| 9,736,147 B1 * | 8/2017 | Mead | ..................... | H04L 63/083 |
| 9,927,883 B1 * | 3/2018 | Lin | ..................... | G06F 3/03543 |
| 2006/0224898 A1 * | 10/2006 | Ahmed | ................. | G06F 21/316 713/186 |
| 2012/0278879 A1 * | 11/2012 | Ganem | ................... | G06F 21/34 726/16 |
| 2014/0078061 A1 * | 3/2014 | Simons | ............... | G06F 3/03543 345/163 |
| 2016/0197918 A1 * | 7/2016 | Turgeman | ............... | G06F 21/31 726/4 |

\* cited by examiner

*Primary Examiner* — Matthew T Henning
(74) *Attorney, Agent, or Firm* — Sage Patent Group (57) ABSTRACT

A method of performing operations by a processor of a computer terminal, includes determining an operation system (OS) speed scaling gain used by the OS to transform mouse movement data, which is received from a mouse device via a device interface circuit, into mouse speed data that controls positioning of a mouse pointer relative to pixel locations on a display device. A computer terminal identifier is generated based on the OS speed scaling gain. A computer identification message containing the computer terminal identifier is communicated through a network interface circuit. Related computer terminals and computer authentication nodes are disclosed.

15 Claims, 8 Drawing Sheets

```
CallbackOnMouseMoveEvent ()
    LastSeenX = CurrentX
    LastSeenY = CurrentY
    LastSeenTimeStamp = CurrentTimeStamp
    CurrentX = GetCurrentXMousePosition ()
    CurrentY = GetCurrentYMousePosition ()
    CurrentTimeStamp = GetCurrentTimeStamp ()
DistanceTravelled = Sqrt (Pow ((CurrentX - LastSeenX), 2) + Pow ((CurrentY -
LastSeenY), 2))
    TimeTaken = CurrentTimeStamp – LastSeenTimeStamp
    CurrentSpeed = DistanceTravelled / TimeTaken;
    If (MaxSpeedSeenSoFar < CurrentSpeed)
            MaxSpeedSeenSoFar = CurrentSpeed
```

FIGURE 6

| BROWSER | MOUSE SPEED CONFIGURED | SPEED DETECTED |
|---|---|---|
| CHROME | SLOWEST | 0.3225 |
| CHROME | MEDIUM | 1.2635 |
| CHROME | FASTEST | 1.389 |
| FIREFOX | SLOWEST | 1.7365 |
| FIREFOX | MEDIUM | 4.8765 |
| FIREFOX | FASTEST | 5.044 |
| IE | SLOWEST | 1.208 |
| IE | MEDIUM | 1.5315 |
| IE | FASTEST | 2.5685 |

COMPUTER SECURITY BASED ON MOUSE DEVICE SPEED SETTING AUTHENTICATION

BACKGROUND

The present disclosure relates to computer security and more particularly to controlling access to protected information based on authentication of computer terminals.

Some content owners desire to restrict some content, such as documents containing confidential information or copyrighted works, to being accessible to only authorized computer terminals. The authorized computer terminals may be allowed access because they are determined to be more secure by design and/or trusted because of a known relationship to authorized users. For example, an authorized terminal may be provided by an employer or may be provided by a user who has registered the terminal for use in accessing the content. Such content owners would need a way to allow the content to be accessible only from computer terminals having a confirmed identity. However, fraudsters have developed sophisticated techniques to obtain credentials of users who are authorized to access content. Some of these fraudsters have moreover developed sophisticated techniques to cause computer terminals operated by the fraudsters to impersonate other computer terminals.

Electronic fingerprinting can be used to collect information about a computer terminal for the purpose of uniquely identifying it. A browser cookie can be stored on a computer terminal to contain information that forms an electronic fingerprint for the computer terminal, however cookies can be prone to tampering and can be discarded at any time by users or blocked by user preferences. An inventory of software versions and types residing on a computer terminal can also be used to form an electronic fingerprint, however software can be frequently updated and deleted by users. There is a need for electronic fingerprinting techniques for computer terminals that can be accurately repeated and beyond user manipulation.

SUMMARY

Some embodiments disclosed herein are directed to a method of performing operations by a processor of a computer terminal to determine an operation system (OS) speed scaling gain that is used by the OS to transform mouse movement data, which is received from a mouse device via a device interface circuit, into mouse speed data that controls positioning of a mouse pointer relative to pixel locations on a display device. A computer terminal identifier is generated based on the OS speed scaling gain. A computer identification message containing the computer terminal identifier is communicated through a network interface circuit.

Some other embodiments disclosed herein are directed to a method of performing operations by a processor of a computer authentication node. The method includes receiving through a network interface circuit a computer identification message containing a first computer terminal identifier that is indicative of a first OS speed scaling gain that is used by the OS of a first computer terminal to transform mouse movement data into mouse speed data that controls positioning by the first computer terminal of a mouse pointer relative to pixel locations on a display device. The operations receive, through the network interface circuit from a second computer terminal, a read request message containing a data address that is requested to be read and a second computer terminal identifier that is based on a second OS speed scaling gain. A determination is made whether the second computer terminal that communicated the read request message is the same as the first computer terminal that communicated the computer identification message, based on comparison of the first computer terminal identifier to the second computer terminal identifier. The operations control whether permission is granted for the read request message to read data from the data address, based a result of the determination.

Some other embodiments disclosed herein are directed to a computer program product that includes a non-transitory computer readable storage medium including computer readable program code embodied in the medium that when executed by a processor of a computer terminal causes the processor to perform operations. The operations include determining an OS speed scaling gain that is used by the OS to transform mouse movement data, which is received from a mouse device via a device interface circuit, into mouse speed data that controls positioning of a mouse pointer relative to pixel locations on a display device. The operations generate a computer terminal identifier based on the OS speed scaling gain, and communicate through a network interface circuit a computer identification message containing the computer terminal identifier.

Other methods, computer program products, computer terminals, and authentication nodes according to embodiments will be or become apparent to one with skill in the art upon review of the following drawings and detailed description. It is intended that all such additional methods, computer program products, computer terminals, and authentication nodes be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Modern operating systems enable a user to customize or configure the speed at which a displayed mouse pointer is moved on a display device relative to the speed at which a mouse device is moved by the user. Various embodiments of the present disclosure are directed to generating a unique identifier for a computer terminal which is based on determining a speed scaling gain that is used by an operation system (OS) to transform mouse movement data, which is received from a mouse device via a device interface circuit, into mouse speed data that controls positioning of a mouse pointer relative to pixel locations on a display device. The speed scaling gain may be set by a user through a mouse speed settings interface where, for example, a user can move a speed setting along a fuzzy scale between a slowest setting and a fastest setting. As will be explained in further detail below, the speed setting gain may include further gain multipliers that are based on, for example, an acceleration gain and/or a filter gain that is used by the OS during the transformation of the mouse movement data into the mouse speed data. The acceleration gain may be defined by a user to cause the transformation to use a measurement of acceleration of the mouse device to control the change in mouse device speed and associated effect on future transformations to generate the mouse speed data. These and more detailed embodiments are explained below for generating computer terminal identifier that can be used to identify computer terminals.

Figure 1:
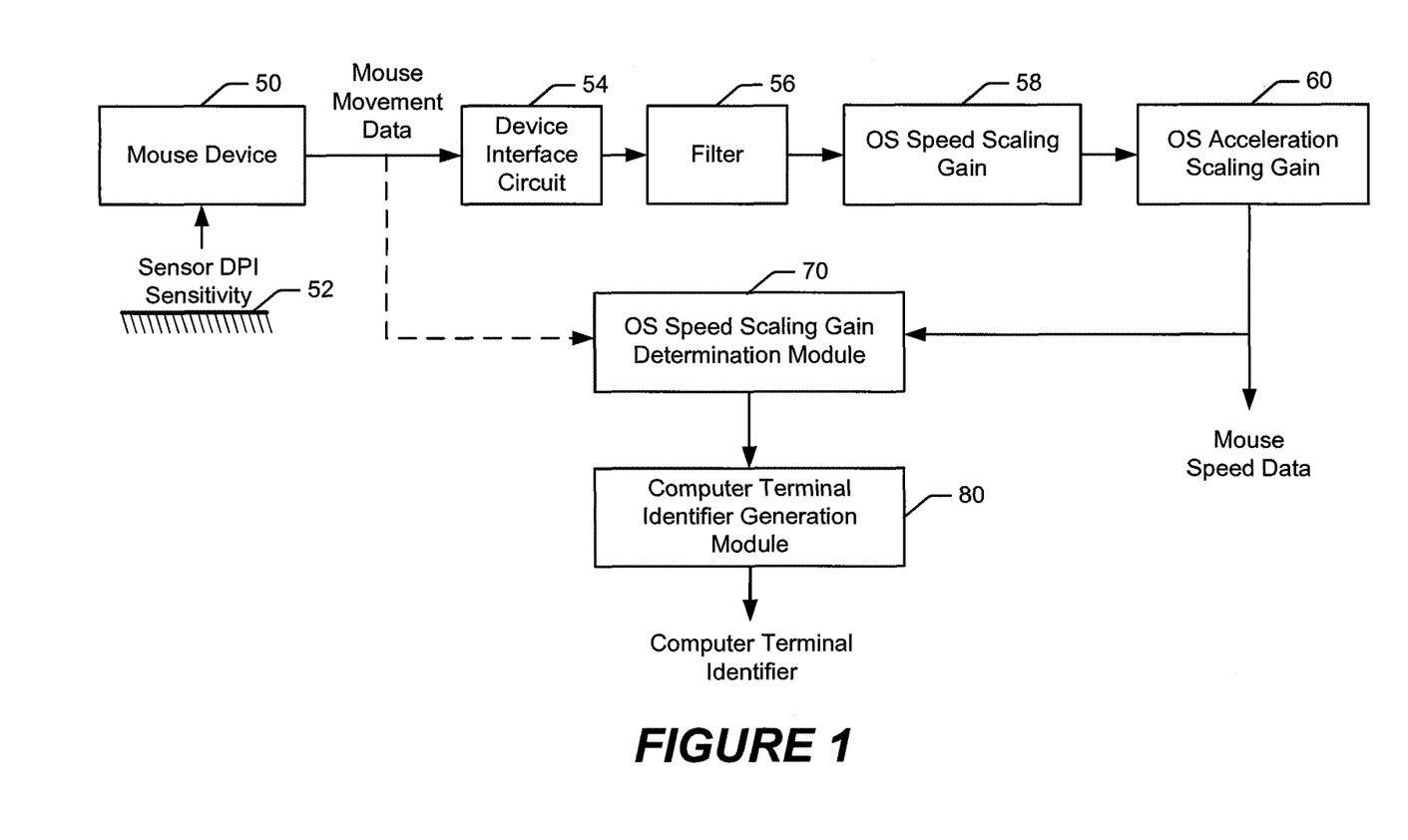
FIG. 1 is a block diagram of operations by an operating system to transform mouse movement data into mouse speed data and further operations by an authentication application to generate a computer terminal identifier based on a speed scaling gain used by the operating system during the transformation, in accordance with some embodiments of the present disclosure.

FIG. 1 is a block diagram of operations by an OS executed by a processor circuit of a computer terminal which operates to transform mouse movement data from a mouse device 50 into mouse speed data. In accordance with some embodiments of the present disclosure, an authentication application operates to generate a computer terminal identifier based on a speed scaling gain used by the OS during the transformation.

Referring to FIG. 1, a physical mouse device 50 is provided that can be moved by a user along a physical surface 52 to control positioning of a mouse pointer relative to pixel locations on a display device. The mouse device 50 outputs mouse movement data which is indicative of the movement sensed by the mouse device 50. Beyond the physical movement of the mouse device 50, generation of the mouse movement data is further dependent upon sensor characteristics, such as the dots-per-inch (DPI) resolution of an optical sensor of the mouse device 50, and presence of surface 52 features that can be sensed by the sensor. A device interface circuit 54 of the computer terminal receives the mouse movement data. The device interface circuit 54 may be a USB serial data interface circuit or other wired interface circuit, or may be a Bluetooth transceiver interface circuit, a WIFI direct transceiver interface circuit, or other wireless RF communication circuit.

A filter component 56 may filter the mouse movement data to remove noise or other spurious movement indications to output filtered mouse movement data to an OS speed scaling component 58. The OS speed scaling component 58 generates a speed vector that indicates the speed and direction of the mouse device 50 along a plurality of defined axes. The speed vector is scaled using an OS speed scaling gain to generate a scaled speed vector which is used to control positioning of a mouse pointer relative to pixel locations on the display device. A value of the OS speed scaling gain may be set by a user through a mouse speed settings interface where, for example, a user can move a speed setting along a fuzzy scale, e.g., selecting among a substantial number of values (such as more than 10 or more preferably more than 20), between a slowest setting and a fastest setting. Setting the OS speed scaling gain value enables a user to control how much movement of the mouse pointer across the display device occurs responsive to physical movement of the mouse device 50.

The scaled speed vector may be further scaled by an OS acceleration scaling component 60 which generates an acceleration vector based on a rate of change of the speed vector, and uses a magnitude of the acceleration vector as an OS acceleration scaling gain to adjust the scaled speed vector to generate an acceleration adjusted scaled speed vector. The acceleration adjusted scaled speed vector can then be used to control positioning of the mouse pointer relative to pixel locations on the display device. A value of the OS acceleration scaling gain may be set by a user through a mouse acceleration settings interface where, for example, a user can move an acceleration setting along a fuzzy scale between a slowest setting and a fastest setting to select among the substantial number of intermediate settings and/or by selecting between activating and deactivating use of a predefined OS acceleration scaling gain. Setting the OS acceleration scaling gain value enables a user to control how acceleration of the mouse device 50 affects the rate of movement of the mouse pointer across the display device.

Figure 3:
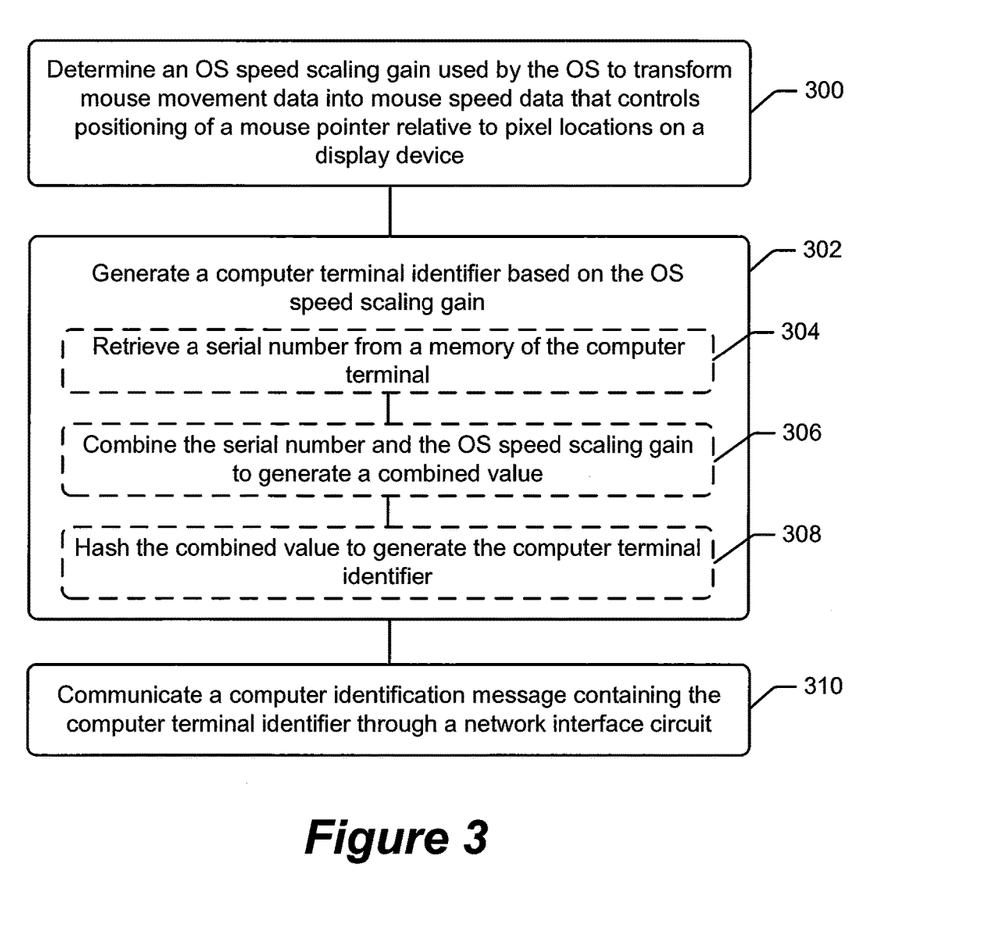
FIGS. 3-5 are flowcharts of operations by a processor of a computer terminal to generate a computer terminal identifier based on speed scaling gain used during transformation of mouse movement data into mouse speed data, in accordance with some embodiments of the present disclosure.

Referring to FIGS. 1 and 3, in accordance with some present embodiments, an OS speed scaling determination module 70 determines (block 300) the OS speed scaling gain used by the OS to transform mouse movement data, which is received from the mouse device 50 via the device interface circuit 54, into mouse speed data that controls positioning of a mouse pointer relative to pixel locations on a display device. A computer terminal identification generation module 80 generates (block 302) a computer terminal identifier based on the OS speed scaling gain and then communicates (block 310) through a network interface circuit a computer identification message containing the computer terminal identifier.

In one embodiment, the module 310 generates (block 302) the computer terminal identifier based on retrieving (block 304) a serial number for the computer terminal from a memory of the computer terminal, and combining (block 306) the serial number and the OS speed scaling gain to generate a combined value. The module 310 then hashes (block 308) the combined value to generate the computer terminal identifier.

In another embodiment, the module 310 generates (block 302) the computer terminal identifier based on generating a seed value based on the OS speed scaling gain, and processing the seed value through a pseudo-random number generator to generate the computer terminal identifier.

Figure 4:
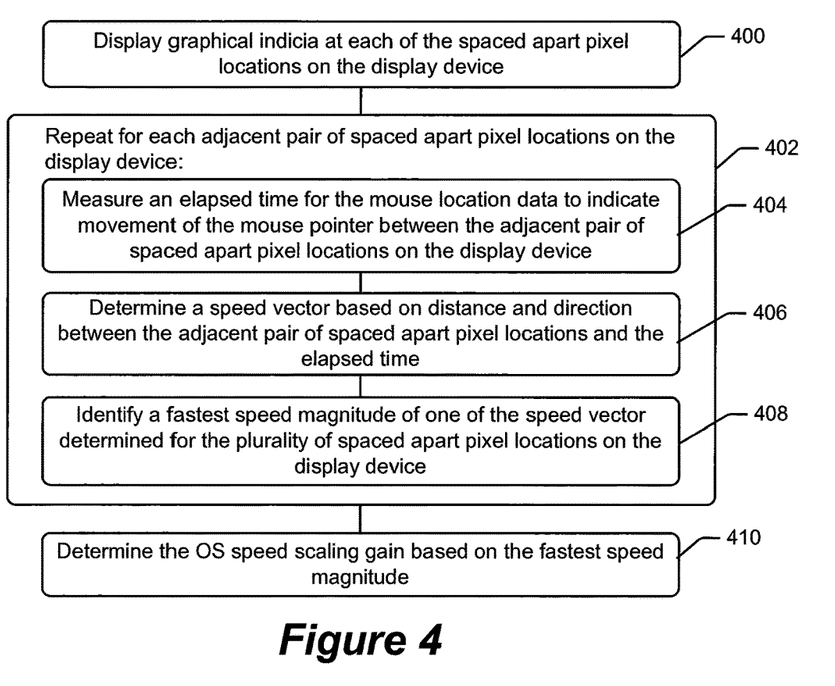

Referring to FIGS. 1 and 4, to determine the OS speed scaling gain used by the OS to transform mouse movement data into the mouse speed data, the module 70 may measure (block 404) an elapsed time for the mouse speed data to indicate movement of the mouse pointer between a pair of spaced apart pixel locations on the display device, and determine (block 406) the OS speed scaling gain based on distance between the pair of spaced apart pixel locations and the elapsed time.

In a further embodiment, the module 70 repeats (block 402) for each adjacent pair of spaced apart pixel locations on the display device, the measuring (block 404) and the determining (block 406). The module 70 identifies (block 408) a fastest speed magnitude of one of the speed vectors determined for the plurality of spaced apart pixel locations on the display device. The module 70 then determines (block 410) the OS speed scaling gain based on the fastest speed magnitude.

In a further embodiment, the module 70 initiates display (block 400) of graphical indicia at each of the spaced apart pixel locations on the display device prior to measuring (block 404) the elapsed times for the mouse speed data to indicate movement of the mouse pointer between the adjacent pairs of the spaced apart pixel locations.

Figure 5:
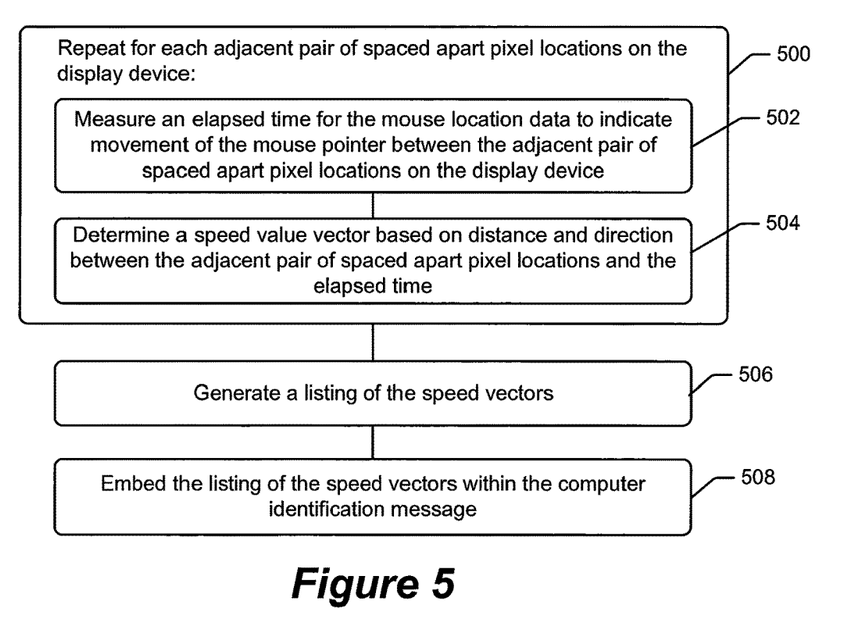

Referring to FIGS. 1 and 5, to determine the OS speed scaling gain used by the OS to transform mouse movement data into the mouse speed data, the module 70 may repeat (block 500) for each adjacent pair of spaced apart pixel locations on the display device, the measuring (block 502) and the determining (block 504). The module 70 may then generate the computer terminal identifier based on generating (block 506) a listing of the speed vectors, and embed (block 508) the listing of the speed vectors, as an indication of the computer terminal identifier, within the computer identification message that is communicated through the network interface circuit.

Figure 6:
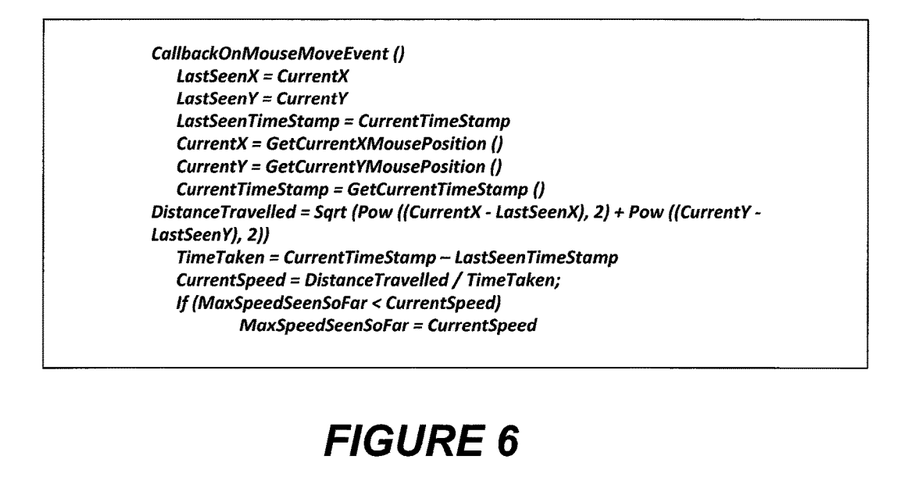
FIG. 6 is a listing of computer program instructions for a functional routine that can be called by a processor to measure mouse speed in accordance with some embodiments of the present disclosure.

FIG. 6 is a listing of computer program instructions for a functional routine that can be called by a processor to measure mouse speed in accordance with some embodiments of the present disclosure. Referring to FIG. 6, the functional routine determines the current location of the mouse device 50 along an X axis and Y axis using function calls GetCurrentXMousePosition( ) and GetCurrentYMousePosition, respectively. The distance traveled (DistanceTravelled) by the mouse device 50 over an elapsed time (CurrentTimeStamp−LastSeenTimeStamp) is determined based on the magnitude of the X and Y distance vectors. The current speed (CurrentSpeed) of the mouse device 50 is determined based on a ration of the distance traveled to the elapsed time. A maximum measured speed (MaxSpeedSeenSoFar) of the mouse device 50 tracked over repetitions of the measurements.

Figure 7:
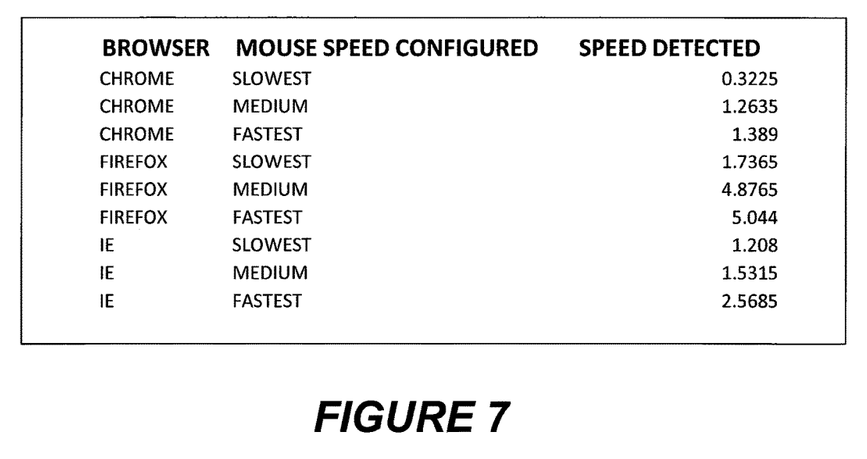
FIG. 7 is a table that illustrates the effect of browser configuration and mouse speed scaling gain configuration on corresponding measurements of mouse speed based on the function routine of FIG. 6 in accordance with some embodiments of the present disclosure.

FIG. 7 is a table that illustrates the effect of browser configuration and mouse speed scaling gain configuration on corresponding measurements of mouse speed based on the function routine of FIG. 6 in accordance with some embodiments of the present disclosure. Referring to FIG. 7, three different Internet browser applications are identified with associated mouse speed that were detected based on three different mouse speed configurations, which are examples of OS speed scaling gains). For example, with the OS speed scaling gain value set to a same "slowest" value, mouse speed measurements while using the Chrome browser, Firefox browser, and the Internet Explorer browser each produced different values. Then with the OS speed scaling gain value set to a same "medium" value, mouse speed measurements while using the Chrome browser, Firefox browser, and the Internet Explorer browser each produced different values. Similarly, with the OS speed scaling gain value set to a same "fastest" value, mouse speed measurements while using the Chrome browser, Firefox browser, and the Internet Explorer browser each produced different values.

Consequently, the OS speed scaling gain that is presently being used by an OS of a computer terminal to transform mouse movement data into mouse speed data that controls positioning of a mouse pointer relative to pixel locations on a display device, can be determined based on measurement of the mouse speed, and may be further determined more accurately by taking into account a known relationship between measured speeds and combinations of a type of Internet browser that being actively processed by a processor of the computer terminal while the mouse speed is being measured and the OS speed scaling gain values. The OS speed scaling gain can then be used to generate a computer terminal identifier. Although only three different mouse speed configuration values are shown in FIG. 7, any plural number of mouse speed configuration values may be allowed to be set through a settings interface provided to a user.

Figure 8:
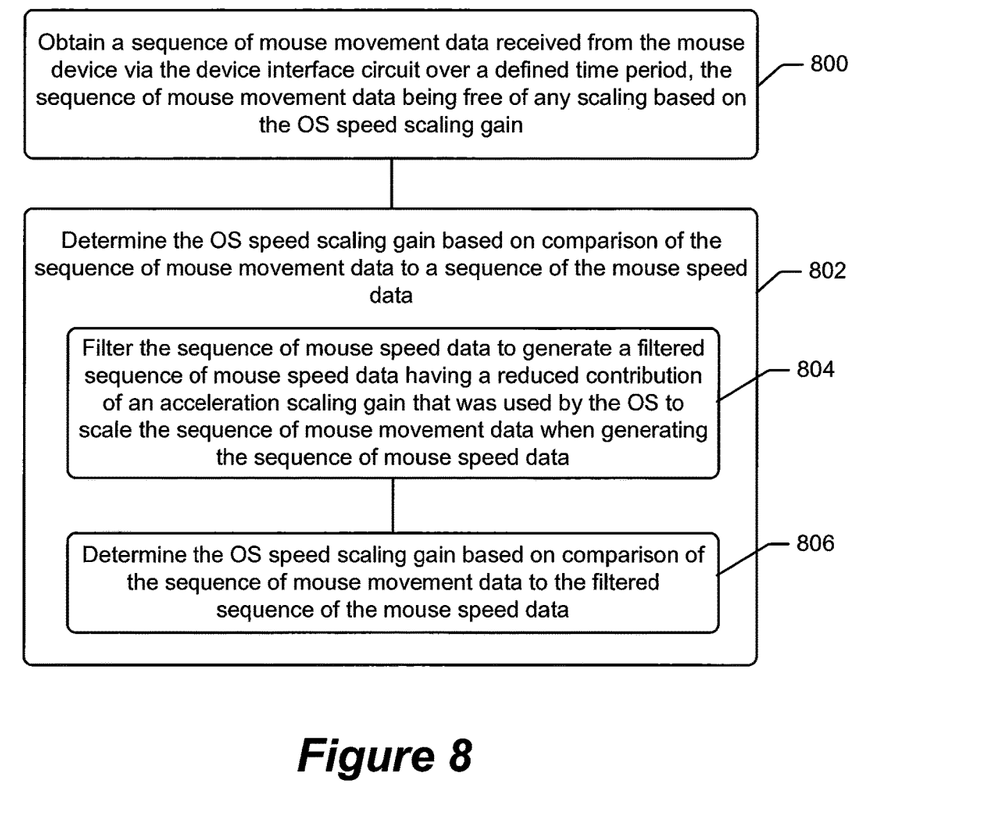
FIG. 8 is a flowchart of further operations by a processor of a computer terminal to generate a computer terminal identifier in accordance with some embodiments of the present disclosure.

FIG. 8 is a flowchart of further operations by a processor of a computer terminal to generate a computer terminal identifier in accordance with some embodiments of the present disclosure.

Referring to FIG. 8, the module 70 may determine the OS speed scaling gain based on obtaining (block 800) a sequence of mouse movement data received from the mouse device 50 via the device interface circuit 54 over a defined time period. The sequence of mouse movement data is obtained to be free of any scaling based on the OS speed scaling gain, such as by obtaining the mouse movement data directly from the device interface circuit 54 before the filtering 56 and/or before operation of OS speed scaling gain module 58. The mouse movement data may be obtained free of any scaling based on OS speed scaling gain using the WM_INPUT command in Windows, which reads the mouse data directly from a Human Interface Device (HID) stack to provide high-definition (fine granularity) readings of mouse movement data. The module 70 then determines (block 802) the OS speed scaling gain based on comparison of the sequence of mouse movement data to a sequence of the mouse speed data.

In a further embodiment, when determining (block 802) the OS speed scaling gain, the module 70 may filter (block 804) the sequence of mouse speed data to generate a filtered sequence of mouse speed data having a reduced contribution of an acceleration scaling gain that was used by the OS to scale the sequence of mouse speed data when generating the sequence of mouse movement data. The module 70 may then determine (block 806) the OS speed scaling gain based on comparison of the sequence of mouse movement data to the filtered sequence of mouse speed data.

In one embodiment, the module 70 determines the OS speed scaling gain based on a ratio of values of the sequence of mouse movement data to values of the sequence of mouse speed data.

The identification information for a computer terminal can be registered with an authentication node, which may reside in a content server or another computer terminal, with access privileges being defined for use in subsequent authentication of the computer terminal and controlling access by the computer terminal according to the defined access privileges to content that is stored in the content server or the other computer terminal. In this manner, characteristics of the operations and gain values used to transform mouse movement data into mouse speed data by a particular computer terminal can be used as a fingerprint of that computer terminal, and used to identify the computer terminal and more securely restrict content accessibility to that particular computer terminal. Moreover, in contrast to prior art approaches for identifying a computer terminal using cookies or software versions stored on the computer terminal, computer terminals can be identified using intrinsic operational performance characteristics of the cache memory structure which cannot be deleted or modified by the user.

Figure 2:
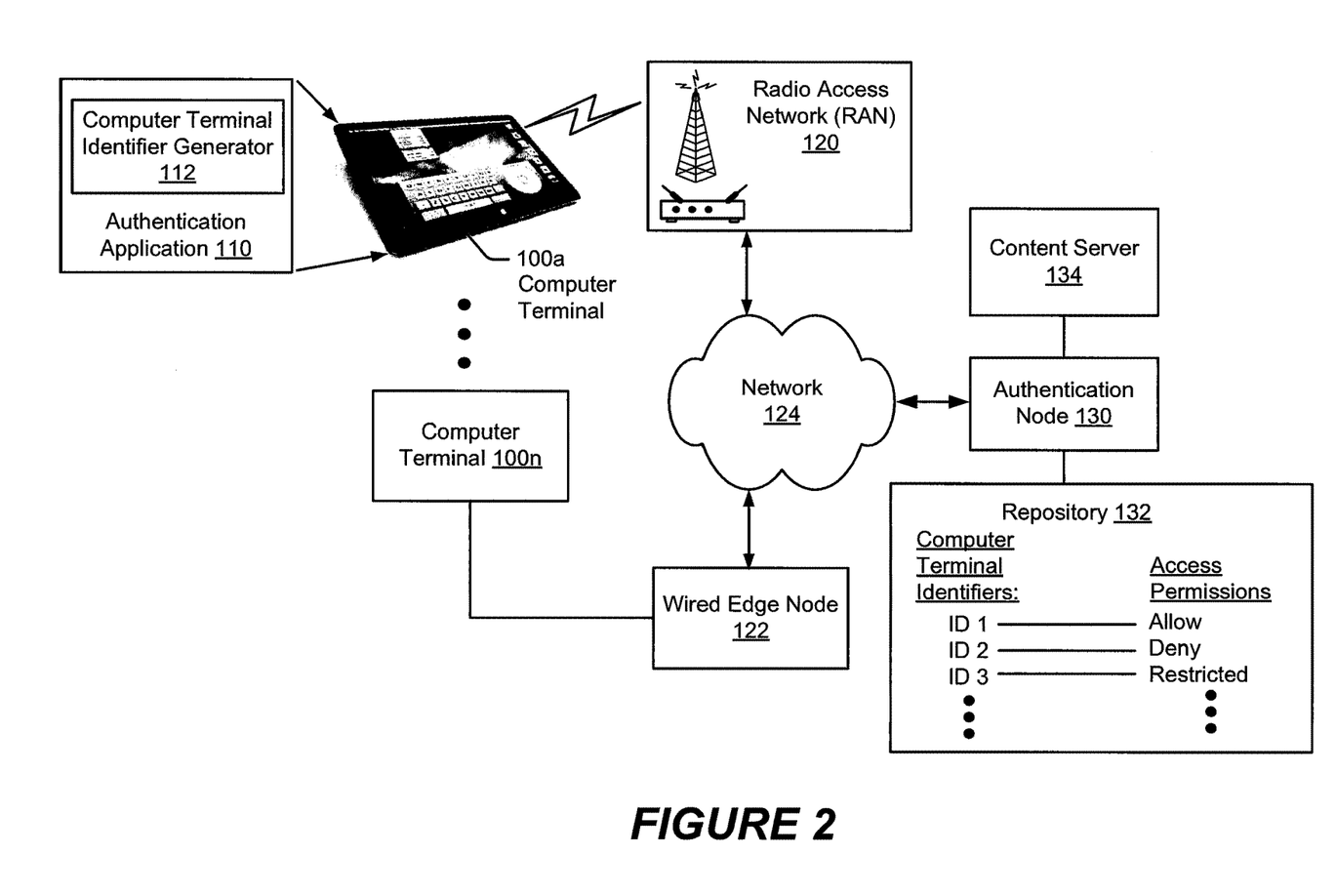
FIG. 2 is a block diagram of a system for authenticating computer terminals using computer terminal identifiers that are generated based on speed scaling gains used during transformation of mouse movement data into mouse speed data, in accordance with some embodiments of the present disclosure.

FIG. 2 is a block diagram of a system for authenticating computer terminals 100a-100n using computer terminal identifiers that are generated based on speed scaling gains used during transformation of mouse movement data into mouse speed data, in accordance with some embodiments of the present disclosure.

Referring to FIG. 2, a user may be able to operate each of the computer terminals 100a-100n (individually referred to as computer terminal 100) to attempt to access content on the content server 134 via one or more radio access networks 120 and/or a wired edge node 122 and a data network 124. At times, the user may operate one or more of the computer terminals 100a-100n simultaneously or in tandem to attempt to access the content. The computer terminal 100 may be any electronic computing device that can communicate through one or more communication networks with the content server 134, including, but not limited to, a desktop computer, a laptop computer, a tablet computer, a mobile phone, a game console, a media player, etc.

In accordance with various embodiments disclosed herein, an authentication node 130 uses a computer terminal identifier received from a computer terminal 100 to authenticate the computer terminal 100, and selectively allows or blocks access by the computer terminal 100 to the content on the content server 134 based on a result of the authentication. The content may reside within the content server 134 and/or may be available through the content server 134 from a content provider (e.g., a streaming video subscription operator) and/or may reside on another computer terminal 100 having restricted access controls based on operations explained herein for the authentication node 130.

The computer terminal 100 includes an authentication application 110 having a computer terminal identifier generator 112 that is performed by a processor integrated within the computer terminal 100. The authentication application 110 may be lightweight code provided by the content server 134 or another provider interface for execution by the computer terminal 100 during an on-line session to generate and report the computer terminal identifier to the authentication node 130.

Figure 9:
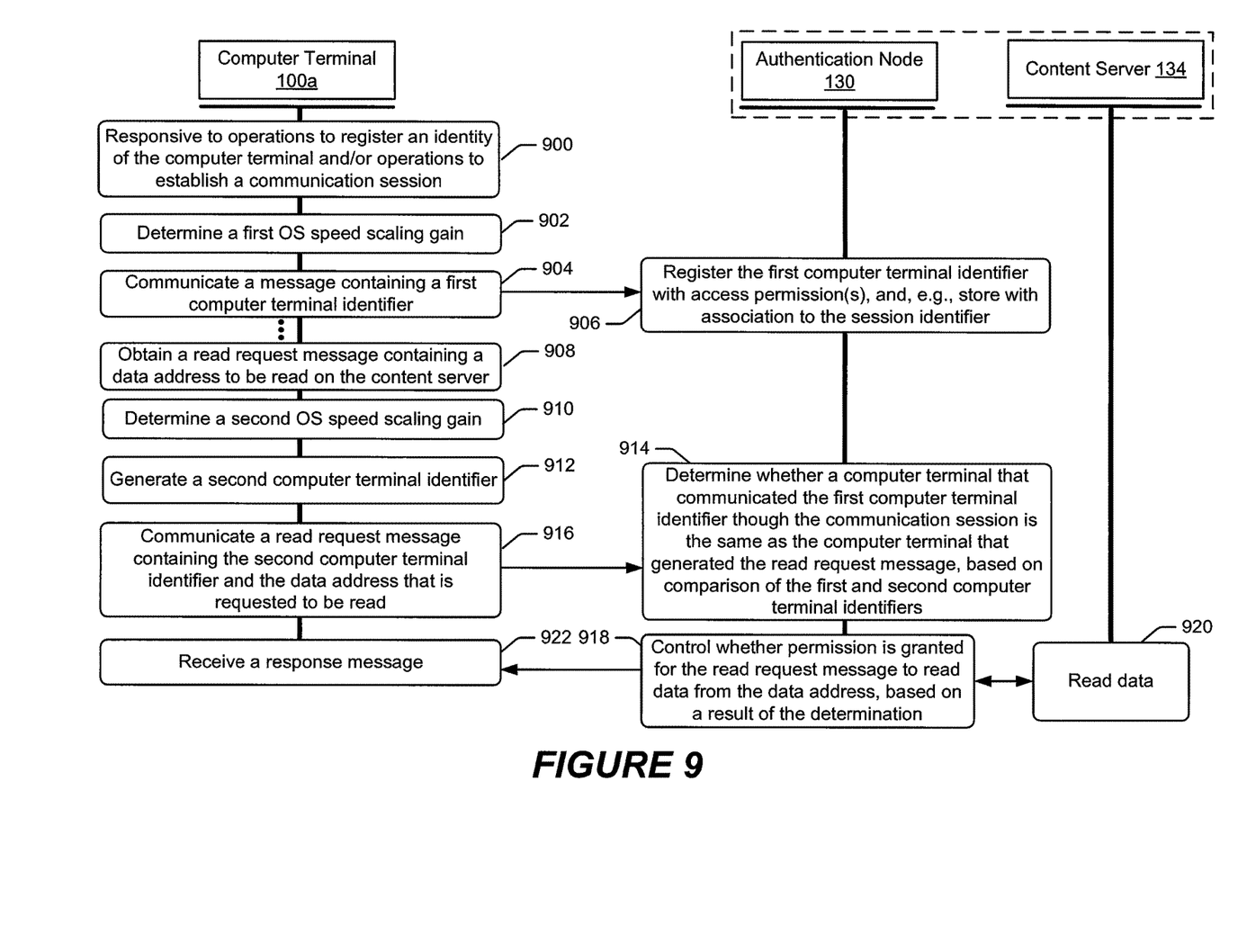
FIG. 9 is a combined data flow diagram and flowchart of operations by a computer terminal, an authentication node, and a content server that control access by the computer terminal to data on the content server based on computer terminal identifiers that are generated based on a determined operation system speed scaling gain, in accordance with some embodiments of the present disclosure.

These and related embodiments are explained with regard to FIG. 9, which is a combined data flow diagram and flowchart of operations by a computer terminal 100a, an authentication node 130, and a content server 134 that control access by the computer terminal 100a to data on the content server 134 based on a determined OS speed scaling gain, in accordance with some embodiments of the present disclosure.

Referring to FIG. 9, the computer terminal 100a responds (block 900) to operations that are performed to register an identity of the computer terminal 100a with the authentication node 130 and/or operations that are performed to establish a communication session with the content server 134, by determining (block 902) a first OS speed scaling gain and generates a first computer terminal identifier based thereon, according to one or more embodiments disclosed herein. The computer terminal 100a communicates (block 904) a computer identification message containing the first computer terminal identifier through a network interface circuit, via one or more radio access networks 120 and/or a wired edge node 122 and a data network 124, to the authentication node 130. Although the authentication node 130 is illustrated as being separate from the content server 134, its functionality may be at least partially incorporated within the content server 134.

In one embodiment, the authentication node 130 receives the computer identification message and registers (block 906) the first computer terminal identifier with access permissions, which may be stored in a repository 132 (FIG. 1) with a logical association to a session identifier for the session that was/is being established, for subsequent use in authenticating whether a subsequently received message containing a second first computer terminal identifier was generated by the same computer terminal that was registered (block 906). The two computer terminals may be determined to be the same when the first and second computer terminal identifiers are identical or, in some embodiments, have a threshold level of similarity according to a defined rule.

The authentication node 130 registers (block 906) the first computer terminal identifier with access permission(s) that is to be granted to the computer terminal 100a for accessing data stored on the content server 134. The authentication node 130 can generate the repository 132 shown in FIG. 1 where computer terminal identifiers received from different computer terminals are stored with logical associations to the access permissions that are granted thereto. In the example repository 132 shown in FIG. 1, a first computer terminal identifier is "allowed" to access data on the content server 134, a computer terminal that generates the second computer terminal identifier is "denied" access to data, i.e., blocked from accessing data, on the content server 134. Still another computer terminal that generates a third computer terminal identifier is granted "restricted" access to data, e.g., allowed to access data stored at only certain defined location(s), on the content server 134.

The computer terminal 100a subsequently obtains (block 908), e.g., receives from another hosted application or process, a request to read a data address on the content server 134. The computer terminal 100a then responsively determines (block 910) a second OS speed scaling gain and generates a second computer terminal identifier based thereon, e.g., via the operations of blocks 300-308 of FIG. 3.

The computer terminal 100a communicates (block 916) a read request message containing the second computer terminal identifier and containing the data address that is requested to be read. The authentication node 130 receives the read request message and determines (block 914) whether a computer terminal that generated the request message is the same as a computer terminal that generated the registration message, based on comparison of the first computer terminal identifier stored in the repository 132 to the second computer terminal identifier received in the read request message.

The authentication node 130 controls (block 918) whether permissions granted for the read request message to read data from the data address, based on a result of the determination (block 914). In one embodiment, responsive to determining (block 914) that the first computer terminal identifier has a threshold level of similarity to the second computer terminal identifier, the authentication node 130 initiates reading (block 920) of the data from the content server 134 using the data address, and communicates (block 918) a data response message containing the data read from the content server 134 through the network interface circuit toward the computer terminal 100*a* that generated the read request message. The computer terminal 100*a* receives (block 922) the data response message and provides the data to the application or other process the requested the read operation. In sharp contrast, the authentication node 130 responds to determining (block 914) that the first computer terminal identifier does not have a threshold level of similarity to the second computer terminal identifier, by discarding the data response message without reading the data addressed by the data address from the content server 134.

In another embodiment, the computer terminal 100*a* receives an authentication challenge message through the network interface circuit, where the authentication challenge message contains a network address of the authentication node 130. Responsive to receiving the authentication challenge message, the computer terminal 100*a* performs the determining (block 300) an operation system (OS) speed scaling gain, the generating (block 302) a computer terminal identifier, and the communicating (block 310) through the network interface circuit the computer identification message, as an authentication response to the authentication challenge message and being directed to the network address of the computer authentication node.

With continued referenced to FIG. 9, the registration message, or other computer identification message, that is received (block 906) contains a first listing of speed vectors determined, by the first computer terminal, e.g., 100*a*, for each of a first plurality of adjacent pairs of spaced apart pixel locations on a display device, based on distance between the first plurality of adjacent pairs of spaced apart pixel locations and the elapsed time for the mouse speed data to indicate movement of the mouse pointer between the first plurality of adjacent pairs of spaced apart pixel locations. The read request message received (block 914) from the second computer terminal, e.g., 100*a*, contains a second listing of speed vectors determined by the second computer terminal for each of a second plurality of adjacent pairs of spaced apart pixel locations on a display device, based on distance between the second plurality of adjacent pairs of spaced apart pixel locations and the elapsed time for the mouse speed data to indicate movement of the mouse pointer between the second plurality of adjacent pairs of spaced apart pixel locations. The authentication node 130 determines (block 914) whether the second computer terminal, e.g., 100*a*, that communicated the read request message is the same as the first computer terminal, e.g., 100*a*, that communicated the computer identification message, based on comparison of the first computer terminal identifier to the second computer terminal identifier. The determination (block 914) can include comparing similarity of a numerical trend through the first listing of speed vectors to a numerical trend through the second listing of speed vectors.

In another embodiment, the computer terminal 100*a* responds to operations to establish a communication session through the network interface circuit with a network node, such as the authentication node 130 and/or the content server 134, by: 1) performing (block 300) the determination of an OS speed scaling gain to output an initial OS speed scaling gain; 2) performing (block 302) the generation of a computer terminal identifier based on the initial OS speed scaling gain to output an initial computer terminal identifier; 3) obtaining a session identifier for the communication session; and 4) performing the communication (block 310) through the network interface circuit the computer identification message directed toward the network node, the computer identification message containing the initial computer terminal identifier and the session identifier. Moreover, the computer terminal 100*a* responds to a request to communicate information through the communication session to the network node, by repeating: 1) the performing (block 300) the determining an OS speed scaling gain to output an updated OS speed scaling gain; 2) the performing (block 302) the generating a computer terminal identifier based on the updated OS speed scaling gain to output an updated computer terminal identifier; and 3) performing the communication (block 310) through the network interface circuit the computer identification message directed toward the network node, the computer identification message containing the updated computer terminal identifier and the session identifier.

With continued referenced to FIG. 9, the authentication node 130 or another network node responds to operations to establish (e.g., block 900) a communication session through the network interface circuit with a computer terminal, e.g., 100*a*, by obtaining a first session identifier for the communication session, performing the receiving (block 906) through a network interface circuit a computer identification message containing a first computer terminal identifier, and storing the first computer terminal identifier in memory, e.g., repository 132, with a logical association to the first session identifier. The operations by the authentication node 130 to receive (block 914) a read request message containing a data address that is requested to be read and a second computer terminal identifier that is indicative of an updated OS speed scaling gain, can include identifying a second session identifier for a communication session through which the read request message was received, and using the second session identifier to retrieve a second computer terminal identifier from the memory, e.g., repository 132. The operations by the authentication node 130 to determine (block 914) whether the second computer terminal that communicated the read request message is the same as the first computer terminal that communicated the computer identification message, can include comparing the second computer terminal identifier, which was retrieved from the memory using the second session identifier, to the first computer terminal identifier.

The authentication node 130 may perform the following operations to be concurrent in time with operations of a Session Initiation Protocol to establish the communication session with the computer terminal, e.g., 100*a*: 1) the obtaining a first session identifier for the communication session; and 2) the receiving (block 906) through a network interface circuit a computer identification message containing a first computer terminal identifier.

Figure 10:
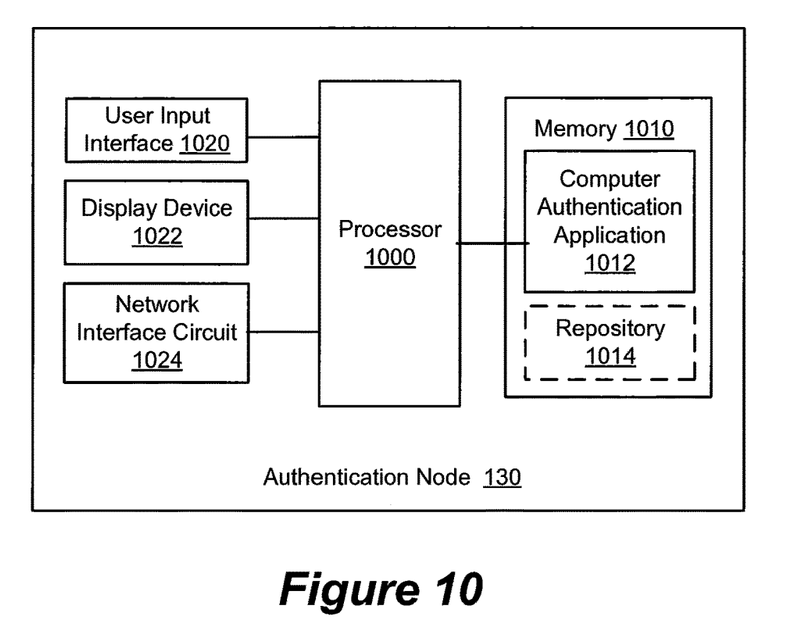
FIG. 10 is a block diagram of an authentication node that is configured according to some embodiments of the present disclosure.

FIG. 10 is a block diagram of an authentication node 130 that is configured according to some embodiments of the present disclosure. Referring to FIG. 10, the authentication node 130 includes a processor 1000, a memory 1010, and a network interface circuit 1024 which can communicate with communication terminals via one or more data networks. The network interface circuit 1024 may include, for example, a radio access transceiver that provides an air communication link having a communication protocol based on 3GPP LTE or other cellular transceiver, WLAN (IEEE 802.11), WiMax, or other radio communication protocol transceiver. The network interface circuit 1024 may alternatively or additionally include a wired network interface, such as Ethernet.

The processor 1000 may include one or more data processing circuits, such as a general purpose and/or special purpose processor (e.g., microprocessor and/or digital signal processor) that may be collocated or distributed across one or more networks. The processor 1000 may include one or more instruction processor cores. The processor 1000 is configured to execute computer program code in the memory 1010, described below as a non-transitory computer readable medium, to perform at least some of the operations described herein as being performed by an authentication node 130, and may further perform operations described herein as being performed by an authentication node, a content server, and/or another network node. The authentication node 130 may further include a user input interface 1020 (e.g., touch screen, keyboard, keypad, etc.) and a display device 1022.

Figure 11:
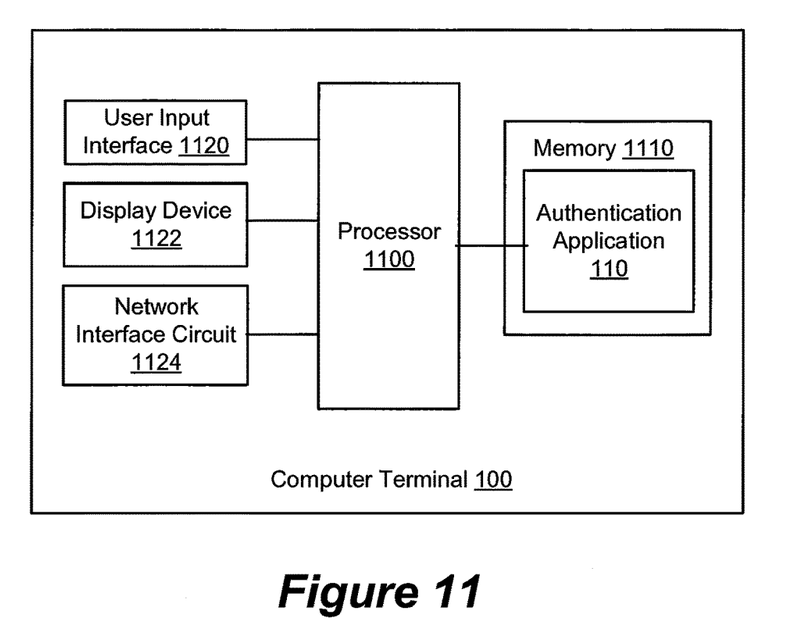
FIG. 11 is a block diagram of a computer terminal that generates a computer terminal identifier in accordance with some embodiments of the present disclosure.

FIG. 11 is a block diagram of a computer terminal 100 that generates a computer terminal identifier in accordance with some embodiments of the present disclosure. Referring to FIG. 11, the computer terminal 100 includes a processor 1100, a memory 1110, and a network interface circuit 1124 which can communicate with communication terminals via one or more data networks. The network interface circuit 1124 may include, for example, a radio access transceiver that provides an air communication link having a communication protocol based on 3GPP LTE or other cellular transceiver, WLAN (IEEE 802.11), WiMax, or other radio communication protocol transceiver. The network interface circuit 1124 may alternatively or additionally include a wired network interface, such as Ethernet.

The processor 1100 may include one or more data processing circuits, such as a general purpose and/or special purpose processor (e.g., microprocessor and/or digital signal processor) that may be collocated or distributed across one or more networks. The processor 1100 may include one or more instruction processor cores. The processor 1100 is configured to execute computer program code in the memory 1110, described below as a non-transitory computer readable medium, to perform at least some of the operations described herein as being performed by a computer terminal. The authentication node 130 may further include a user input interface 1120 (e.g., touch screen, keyboard, keypad, etc.) and a display device 1122.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows by a processor of a computer terminal,
determining an operation system (OS) speed scaling gain used by the OS to transform mouse movement data, which is received from a mouse device via a device interface circuit, into mouse speed data that controls positioning of a mouse pointer relative to pixel locations on a display device,
generating a computer terminal identifier based on the OS speed scaling gain, and
communicating through a network interface circuit a computer identification message containing the computer terminal identifier.

2. The method of claim 1, wherein the generating a computer terminal identifier based on the OS speed scaling gain, comprises:
generating a seed value based on the OS speed scaling gain; and
processing the seed value through a pseudo-random number generator to generate the computer terminal identifier.

3. The method of claim 1, wherein the generating a computer terminal identifier based on the OS speed scaling gain, comprises:
retrieving a serial number from a memory of the computer terminal;
combining the serial number and the OS speed scaling gain to generate a combined value; and
hashing the combined value to generate the computer terminal identifier.

4. The method of claim 1, wherein the determining an OS speed scaling gain used by the OS to transform mouse movement data, which is received from a mouse device via a device interface circuit, into mouse speed data that controls positioning of a mouse pointer relative to pixel locations on a display device, comprises:
measuring an elapsed time for the mouse speed data to indicate movement of the mouse pointer between a pair of spaced apart pixel locations on the display device; and determining the OS speed scaling gain based on distance between the pair of spaced apart pixel locations and the elapsed time.

5. The method of claim 4, further comprising:
for each adjacent pair of spaced apart pixel locations on the display device,
    measuring an elapsed time for the mouse speed data to indicate movement of the mouse pointer between the adjacent pair of spaced apart pixel locations on the display device, and
    determining a speed vector based on distance and direction between the adjacent pair of spaced apart pixel locations and the elapsed time;
identifying a fastest speed magnitude of one of the speed vectors determined for the plurality of spaced apart pixel locations on the display device, and
determining the OS speed scaling gain based on the fastest speed magnitude.

6. The method of claim 5, further comprising:
displaying graphical indicia at each of the spaced apart pixel locations on the display device prior to measuring the elapsed times for the mouse speed data to indicate movement of the mouse pointer between the adjacent pairs of the spaced apart pixel locations.

7. The method of claim 4, further comprising:
for each adjacent pair of spaced apart pixel locations on the display device,
    measuring an elapsed time for the mouse speed data to indicate movement of the mouse pointer between the adjacent pair of spaced apart pixel locations on the display device, and
    determining a speed vector based on distance and direction between the adjacent pair of spaced apart pixel locations and the elapsed time,
wherein the generating a computer terminal identifier based on the OS speed scaling gain, comprises generating a listing of the speed vectors, and
wherein the communicating through a network interface circuit a computer identification message containing the computer terminal identifier, comprises embedding the listing of the speed vectors within the computer identification message.

8. The method of claim 1, wherein the determining an OS speed scaling gain used by the OS to transform mouse movement data, which is received from a mouse device via a device interface circuit, into mouse speed data that controls positioning of a mouse pointer relative to pixel locations on a display device, comprises:
obtaining a sequence of mouse movement data received from the mouse device via the device interface circuit over a defined time period, the sequence of mouse movement data being free of any scaling based on the OS speed scaling gain; and
determining the OS speed scaling gain based on comparison of the sequence of mouse movement data to a sequence of the mouse speed data.

9. The method of claim 8, wherein the determining the OS speed scaling gain based on comparison of the sequence of mouse movement data to a sequence of the mouse speed data, comprises:
determining the OS speed scaling gain based on a ratio of values of the sequence of mouse movement data to values of the sequence of mouse speed data.

10. The method of claim 8, wherein the determining the OS speed scaling gain based on comparison of the sequence of mouse movement data to the sequence of mouse speed data, comprises:
filtering the sequence of mouse speed data to generate a filtered sequence of mouse speed data having a reduced contribution of an acceleration scaling gain that was used by the OS to scale the sequence of mouse speed data when generating the sequence of mouse movement data; and
determining the OS speed scaling gain based on comparison of the sequence of mouse movement data to the filtered sequence of mouse speed data.

11. The method of claim 1, wherein the operations performed by the processor further comprise:
receiving an authentication challenge message through the network interface circuit, the authentication challenge message containing a network address of a computer authentication node; and
responsive to receiving the authentication challenge message, performing the determining an operation system (OS) speed scaling gain, the generating a computer terminal identifier, and the communicating through the network interface circuit the computer identification message, as an authentication response to the authentication challenge message and being directed to the network address of the computer authentication node.

12. The method of claim 1, wherein the operations performed by the processor further comprise:
responsive to operations to establish a communication session through the network interface circuit with a network node,
    performing the determining an OS speed scaling gain to output an initial OS speed scaling gain,
    performing the generating a computer terminal identifier based on the initial OS speed scaling gain to output an initial computer terminal identifier,
    obtaining a session identifier for the communication session, and
    performing the communicating through the network interface circuit the computer identification message directed toward the network node, the computer identification message containing the initial computer terminal identifier and the session identifier;
responsive to a request to communicate information through the communication session to the network node,
    performing the determining an OS speed scaling gain to output an updated OS speed scaling gain,
    performing the generating a computer terminal identifier based on the updated OS speed scaling gain to output an updated computer terminal identifier,
    performing the communicating through the network interface circuit the computer identification message directed toward the network node, the computer identification message containing the updated computer terminal identifier and the session identifier.

13. A computer program product comprising:
a non-transitory computer readable storage medium comprising computer readable program code embodied in the medium that when executed by a processor of a computer terminal causes the processor to perform operations comprising:
    determine an operation system (OS) speed scaling gain used by the OS to transform mouse movement data, which is received from a mouse device via a device interface circuit, into mouse speed data that controls positioning of a mouse pointer relative to pixel locations on a display device,
generate a computer terminal identifier based on the OS speed scaling gain, and
communicate through a network interface circuit a computer identification message containing the computer terminal identifier.

14. The computer program product of claim 13, wherein the generating a computer terminal identifier based on the OS speed scaling gain, comprises:
retrieving a serial number from a memory of the computer terminal;
combining the serial number and the OS speed scaling gain to generate a combined value; and
hashing the combined value to generate the computer terminal identifier.

15. The computer program product of claim 13, wherein the determining an OS speed scaling gain used by the OS to transform mouse movement data, which is received from a mouse device via a device interface circuit, into mouse speed data that controls positioning of a mouse pointer relative to pixel locations on a display device, comprises:
obtaining a sequence of mouse movement data that are separately received from the mouse device via the device interface circuit over a defined time period, the sequence of mouse movement data being free of any scaling based on the OS speed scaling gain;
obtaining a sequence of mouse speed data that is generated by the OS transforming the sequence of mouse movement data using scaling based on the OS speed scaling gain; and
determining the OS speed scaling gain based on a ratio of values of the sequence of mouse movement data to values of the sequence of mouse speed data.

\* \* \* \* \*